(No Model.)  4 Sheets—Sheet 1.
H. SYMES.
MECHANISM FOR PROPELLING VEHICLES.
No. 603,518. Patented May 3, 1898.
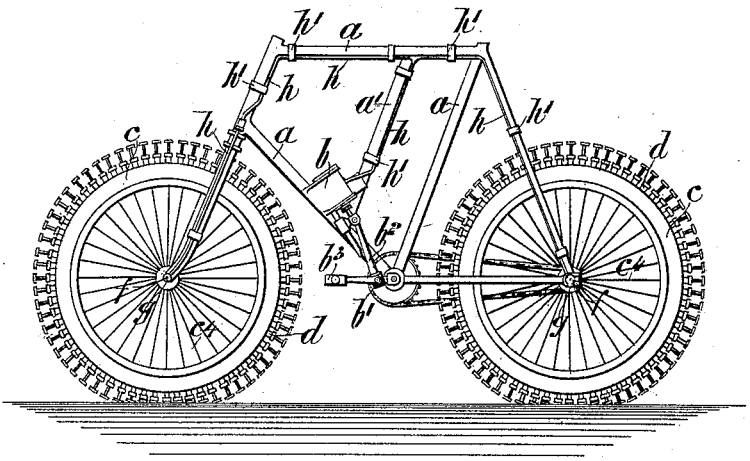
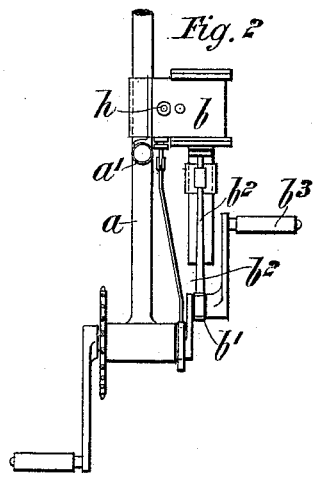

(No Model.) 4 Sheets—Sheet 2.

H. SYMES.
MECHANISM FOR PROPELLING VEHICLES.

No. 603,518. Patented May 3, 1898.

Witnesses
H. van Oldenneel

Inventor
Henry Symes
by
Allan A. Alexander
Attorney (No Model.) 4 Sheets—Sheet 3.

H. SYMES.
MECHANISM FOR PROPELLING VEHICLES.

No. 603,518. Patented May 3, 1898.

Witnesses
H. van Oldenneel
Geo. P. Lindsay

Inventor
Henry Symes.
by
Allan A. Alexander
Attorney (No Model.) 4 Sheets—Sheet 4.
H. SYMES.
MECHANISM FOR PROPELLING VEHICLES.
No. 603,518. Patented May 3, 1898.
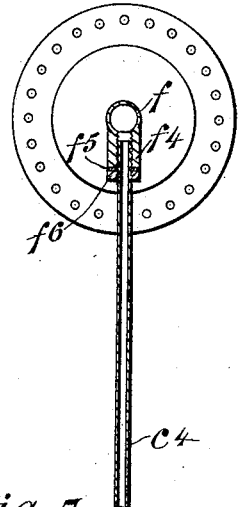
Fig. 7
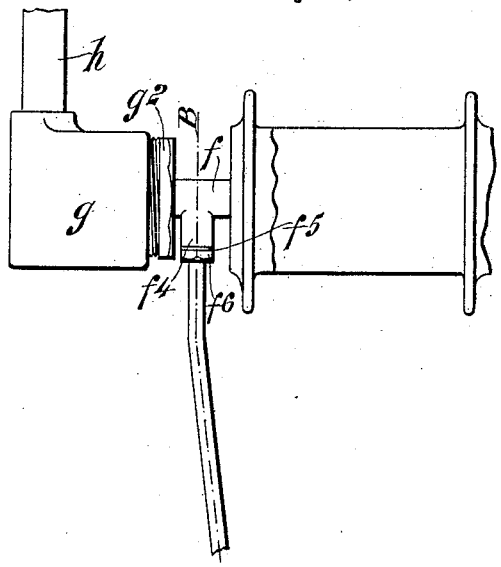
Fig. 8
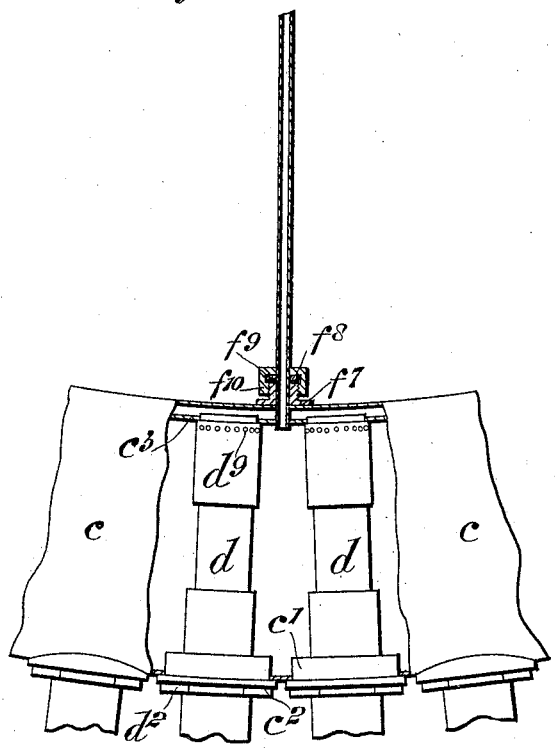
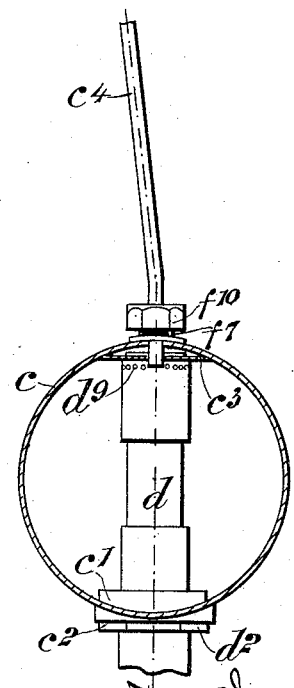
Witnesses
H. van Oldenneel
Geo. P. Whittlesey
Inventor
Henry Symes
by Allan N. Alexander
Attorney
THE NORRIS PETERS CO., PHOTO-LITHO., WASHINGTON, D. C.

UNITED STATES PATENT OFFICE.

HENRY SYMES, OF ALEXANDRA SOUTH, NEW ZEALAND.

MECHANISM FOR PROPELLING VEHICLES.

SPECIFICATION forming part of Letters Patent No. 603,518, dated May 3, 1898.

Application filed May 15, 1897. Serial No. 636,613. (No model.)

*To all whom it may concern:*

Be it known that I, HENRY SYMES, a subject of the Queen of Great Britain, residing at Alexandra South, Otago, in the Colony of New Zealand, have invented an Improved Mechanism for Propelling Vehicles, of which the following is a specification.

This invention relates to vehicles, and has for its object to provide a mechanism by which vehicles may be more easily propelled.

The invention will be described herein with special reference to a bicycle and its adaptability to such vehicles set out, wherefrom its application to other vehicles will be readily seen by a skilled person.

The bicycle is constructed with a frame closely resembling existing machines; but the frame is strengthened to carry an air-motor. The ordinary perishable rubber tire is dispensed with and replaced by a tire of thin steel by preference. A battery of pumps is arranged around the periphery of such steel tire with their piston-rods protruding radially, so that as the wheel is revolved the pressure of the rider forces air into the tire, which becomes a receiver whence the compressed air may be conveyed to the motor to revolve the pedal-cranks.

In order that the invention may be most easily understood, reference will be made to the accompanying drawings while giving a detailed description.

Figure 5:
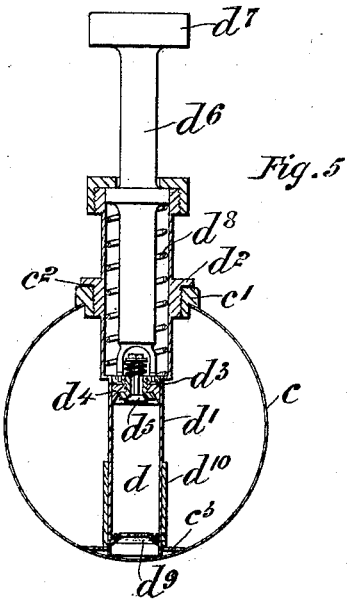
Figure 3:
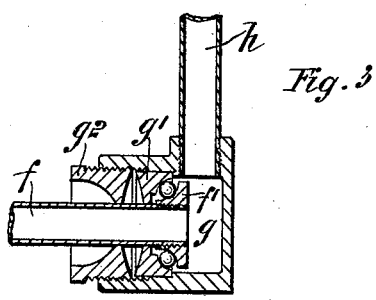
Figure 4:
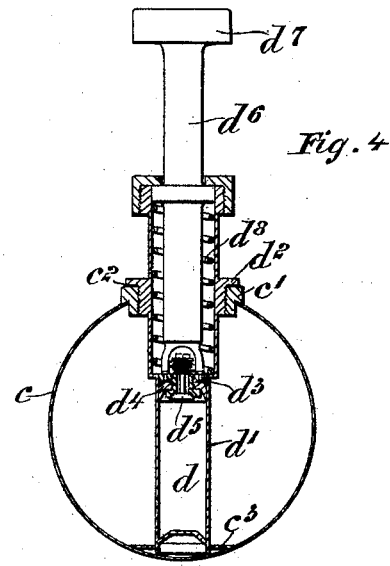
Figure 6:
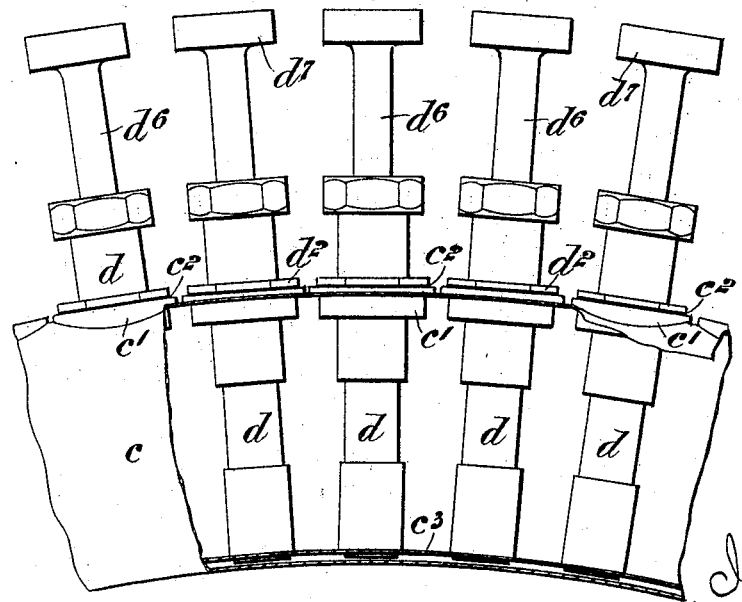

Figure 1 is a side view of a bicycle fitted with the invention. Fig. 2 is a front view of the motor and cranks on a larger scale. Fig. 3 is a section of a union or coupling. Fig. 4 is a section of the steel tire and one of the pumps as used for cushioning only. Fig. 5 is a similar section of one of the pumps as used for forcing air into the tire. Fig. 6 is a side view of several of the pumps in position in the tire. Fig. 7 is a side view of a portion of the tire, partly in section, and a section of the axle and hollow spoke on line A B, Fig. 8. Fig. 8 is a transverse view of the same.

Similar letters refer to corresponding parts.

Referring more particularly to Figs. 1 and 2, the frame $a$ is strengthened by means of a pillar $a'$ to carry the motor $b$, which may be of any suitable construction to be operated by compressed air.

I prefer to have a single motor acting upon the pedal-crank, as shown, though it is obvious that two smaller motors may be used acting on each side of the rear or front wheel, or one motor may operate upon the front wheel and another on the rear wheel.

With a motor as shown the crank is made as illustrated on Fig. 2, where a journal is provided at $b'$ for the connecting-rod $b^2$, the ordinary pedal $b^3$ being provided to revolve at the side of the motor.

The tire $c$ is made, preferably, of thin steel for strength and lightness and is furnished with a battery of pumps $d$, which project radially from the periphery of the tire. The details of the pump are shown in the sections Figs. 4 and 5. The pump-barrel $d'$ has a collar $d^2$, threaded to screw into the boss $c'$, brazed or otherwise secured in the tire $c$, and an air-tight joint is made by means of a washer $c^2$. The bottom of the barrel is supported by passing into a hole provided in a plate $c^3$, secured within the tire.

The piston $d^3$ has a cupped leather washer $d^4$ to prevent the return of the air after it has been admitted through the spring-valve $d^5$. The piston-rod $d^6$ and its foot $d^7$ normally project, as shown, under the pressure of spring $d^8$; but when the foot $d^7$ touches the ground the piston is forced by the weight of the rider into the pump, compressing the air contained in the barrel and forcing it through the holes $d^9$, Fig. 5, and past the india-rubber band $d^{10}$, when it is trapped within the tire $c$ in a manner similar to that employed when inflating an ordinary pneumatic tire. The return of the piston is effected by spring $d^8$, which is preferably housed inside of an enlarged outer portion of the pump-barrel and acts against a collar on the piston-rod fitting inside said enlargement. An annular cap on the outer end of the pump-barrel limits the outward movement of the piston-rod.

The compressed air is conveyed from the tire through any convenient spoke or spokes $c^4$ to the axle $f$, Fig. 3. Reference to Figs. 7 and 8 will show the method of adapting a hollow spoke. The axle $f$ has a boss $f^4$, into which the hollow spoke $c^4$ is screwed and made air-tight by the washer $f^5$ and lock-nut $f^6$. The other end of the spoke is then passed through the nozzle $f^7$ as far as its shoulder $f^8$ and into the tire $c$, and an air-tight joint is made by the washer $f^9$ and nut $f^{10}$. The axle $f$ is hollow, revolves with the hub of the wheel, and is made to project sufficiently to pass into a union or coupling $g$. The end of the axle is screwed to receive the bearing $f'$ after the plate $g'$ and gland $g^2$ have been slipped thereon. A ball-bearing to take the pressure and a stuffing-box are thus provided wherein the axle $f$ may revolve with little friction and without loss of compressed air, which is conducted to the motor $b$ through the pipes $h$, secured to the frame by clips $h'$. If desired, the air may be conveyed through the hollow frame of the machine, which may be made air-tight for the purpose.

In starting the machine the rider works the machine in the ordinary manner, and when the pumps have compressed the air he admits the same to the motor and is thereby assisted in propelling the machine. The operation of compressing the air will provide elasticity to the movements of the pistons, which will thus act in cushioning the tire.

Fig. 4 shows the pump as constructed for merely cushioning the tire and when a motor is not employed, and this subordinate part of my invention is one of its essential features. It will be seen that there is no exit for the air after it has passed through the valve $d^5$, the barrel $d'$ becoming a compression-chamber wherein the air is again and again compressed and operates in cushioning the tire, thus facilitating the propulsion of the same. The return of the piston is insured by the expansive force of the spring $d^8$.

It will be obvious that I may use the pumps on one wheel for compressing the air and the pumps on the other wheel for merely cushioning the tire.

Having now particularly described and ascertained the nature of my said invention and in what manner the same is to be performed, I declare that what I claim is—

1. In a cycle, the combination with a hollow rigid tire, of a plurality of pump-barrels extending radially across said tire and projecting outside of the same, and secured to the tire at each end, pistons in said pump-barrels, spring-valves in said pistons, and piston-rods projecting radially beyond the pump-barrels, substantially as described.

2. In a cycle, the combination with a hollow rigid tire, having in its periphery a series of screw-threaded openings, of a plurality of pump-barrels screwed into said openings, pistons in said barrels, spring-valves in the pistons, piston-rods extending beyond the periphery of the tire, and springs for keeping the piston-rods normally projected, substantially as described.

3. In a cycle, the combination with a hollow metallic tire, having a plurality of openings in its periphery, of screw-threaded bosses secured to the tire at said openings, a plurality of pump-barrels having screw-threaded collars to screw into said bosses, plates inside the tire to receive the inner ends of the pump-barrels, valved pistons in the pump-barrels, and spring-actuated piston-rods projecting beyond the outer ends of the pump-barrels, substantially as described.

4. In a cycle, the combination with a hollow tire, of a pump-barrel secured radially therein, having its outer portion of larger diameter than its inner portion, a piston in the inner portion, a spring-valve in said piston, a piston-rod having a collar fitting in the outer portion of the barrel, a helical spring housed in said outer portion and acting against said collar, and an annular cap on the outer end of the barrel to limit the outward movement of the piston-rod, substantially as described.

5. In a cycle, the combination with a hollow rigid tire, of a pump-barrel secured radially therein, having inlet-ports in its inner end, an elastic band surrounding and covering said ports, a valved piston in the pump-barrel, and a piston-rod projecting beyond the periphery of the tire, substantially as described.

HENRY SYMES.

Witnesses:
W. E. HUGHES,
A. S. COLLINS.